United States Patent
Zhang et al.

(10) Patent No.: US 12,020,025 B1
(45) Date of Patent: Jun. 25, 2024

(54) GUIDED MODERNIZATION OF SOFTWARE APPLICATIONS USING APPLICATION TEMPLATES

(71) Applicant: Amazon Technologies, Inc., Seattle, WA (US)

(72) Inventors: Jiangtao Zhang, Pleasanton, CA (US); Mark Fawaz, Dublin, CA (US); Vivek Chawda, San Jose, CA (US); Sreenaath Vasudevan, Cupertino, CA (US); Ramu Panayappan, Sunnyvale, CA (US); Abdul Jabbar Abdul Rasheed, San Jose, CA (US); Donghao Wei, San Jose, CA (US); Javier Arturo Thiele-Ruiz, Saratoga, CA (US); Kanishk Kaul, Sunnyvale, CA (US); Pranav Prabhakar Firake, San Jose, CA (US); Emery Jacob Comstock, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 17/951,861

(22) Filed: Sep. 23, 2022

(51) Int. Cl.
*G06F 9/44* (2018.01)
*G06F 8/41* (2018.01)
(Continued)

(52) U.S. Cl.
CPC ............ *G06F 8/76* (2013.01); *G06F 8/433* (2013.01); *G06N 20/00* (2019.01)

(58) Field of Classification Search
None
See application file for complete search history.

(56) References Cited

U.S. PATENT DOCUMENTS

| 11,422,797 B1 * | 8/2022 | Zhang | G06F 8/72 |
| 11,620,128 B1 * | 4/2023 | Chawda | G06F 8/75 |
| | | | 717/120 |

(Continued)

OTHER PUBLICATIONS

Mathai et al., Monolith to Microservices: Representing Application Software through Heterogeneous Graph Neural Network, May 2022 (Year: 2022).*

(Continued)

*Primary Examiner* — Insun Kang
(74) *Attorney, Agent, or Firm* — Nicholson De Vos Webster & Elliott LLP

(57) ABSTRACT

Techniques are described for assisting users with the process of modernizing software applications from a source software architectural pattern (e.g., a model—view—controller (MVC) pattern, a multitier architecture, etc.) to a target architectural pattern (e.g., microservices, event-driven architecture, etc.). A decomposition analyzer receives as input artifacts associated with a software application under analysis and an architectural pattern that a user desires to use for a modernized version of the software application. The decomposition analyzer generates, based on the application artifacts, a graph-based model of the software application, where the model includes nodes representing application components (e.g., classes) and edges representing dependency relationships among the components. The decomposition analyzer further uses machine learning techniques and other types of analyses to identify recommended groupings of nodes from the graph-based model for decomposition. These recommendations can be displayed to users in a visualization providing decomposition assessment information.

20 Claims, 8 Drawing Sheets

(51) Int. Cl.
  *G06F 8/76* (2018.01)
  *G06N 20/00* (2019.01)

(56) References Cited

U.S. PATENT DOCUMENTS

| | | | |
|---|---|---|---|
| 11,782,704 B1* | 10/2023 | Tamilselvam | G06F 8/31 |
| | | | 717/145 |
| 2021/0334194 A1* | 10/2021 | Xiao | G06F 11/3684 |
| 2023/0021723 A1* | 1/2023 | Karuppannan | G06F 8/76 |
| 2023/0121209 A1* | 4/2023 | Hwang | G06F 18/23213 |
| | | | 706/12 |

OTHER PUBLICATIONS

Desai et al., Graph Neural Network to Dilute Outliers for Refactoring Monolith Application, AAAI.org, 2021 (Year: 2021).*

Mazlami et al., Extraction of Microservices from Monolithic Software Architectures, IEEE 2017 (Year: 2017).*

Asseldonk, From a Monolith to Microservices: the Effect of Multi-view Clustering (Year: 2021).*

* cited by examiner

GUIDED MODERNIZATION OF SOFTWARE APPLICATIONS USING APPLICATION TEMPLATES

BACKGROUND

Modernizing software applications is a common task for business organizations and other entities desiring to improve their information technology (IT) environments in response to changing software application use cases, resource demands, and user access patterns. For example, while many legacy applications were designed for older operating environments and with lesser expectations in terms of user demand, modern software applications now often need the ability to scale quickly to potentially thousands or millions of users, have global availability, manage large amounts of data, and respond to requests in milliseconds.

The processes for upgrading, converting, rewriting, and performing other operations on software applications to enable improved performance is broadly referred to as software modernization. Software application and software-based system modernization can include porting legacy applications or systems to modern computer programming languages or application frameworks, updating software libraries, protocols, or hardware platforms, and the like. For organizations desiring to make use of cloud provider network resources, the modernization process can include migrating resources from an organization's on-premises environment to a cloud provider network, modernizing an application's architecture with containers, serverless functions, or other more scalable architectures and tools provided by cloud provider networks.

BRIEF DESCRIPTION OF DRAWINGS

Various examples in accordance with the present disclosure will be described with reference to the drawings, in which.

DETAILED DESCRIPTION

Figure 1:
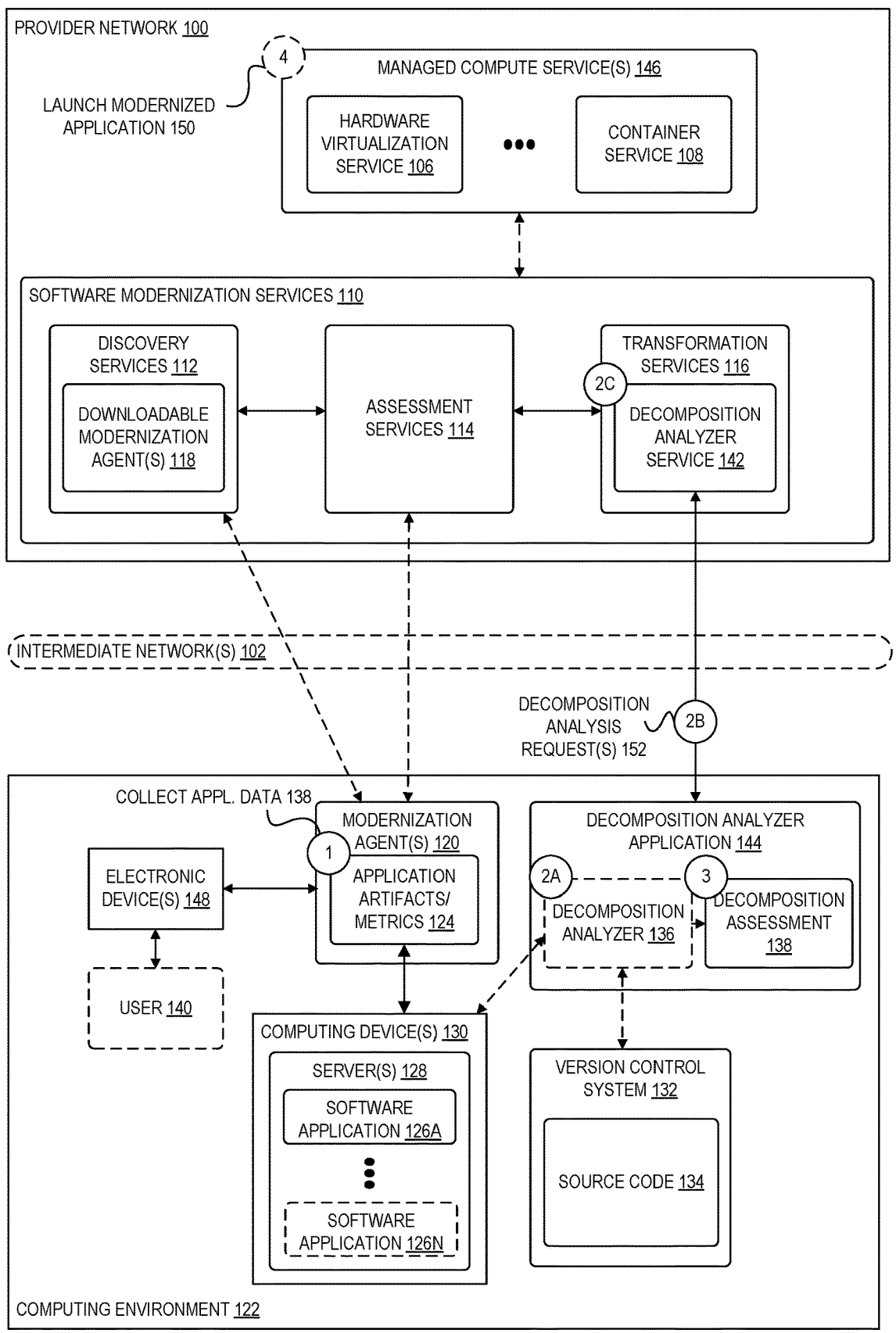
FIG. 1 is a diagram illustrating an environment including a modernization agent and associated services used to provide a guided experience for modernizing software applications including generating recommended decomposition opportunities according to some examples.

The present disclosure relates to methods, apparatus, systems, and non-transitory computer-readable storage media for assisting users with the process of modernizing software applications from a source software architectural pattern (e.g., a model—view—controller (MVC) pattern, a multitier architecture, etc.) to a target architectural pattern (e.g., microservices, event-driven architecture, etc.). According to some examples, a decomposition analyzer is provided that can receive as input artifacts associated with a software application under analysis (e.g., source code, configuration files, etc.) and an architectural pattern that a user desires to use for a modernized version of the software application (e.g., a microservices-based architecture, a container-based architecture, etc.). The decomposition analyzer generates, based on the application artifacts, a graph-based model of the software application, where the model includes nodes representing application components (e.g., classes) and edges representing dependency relationships among the components. In some examples, the decomposition analyzer further uses machine learning (ML) techniques, including the use of application clustering templates to customize the ML techniques, and other types of analyses to identify recommended groupings of nodes from the graph-based model for decomposition to the desired target architectural pattern. These recommendations can be displayed to users in a visualization providing decomposition assessment information. Among other benefits, the described processes enable users to modernize legacy software applications more efficiently, thereby leading to software applications with improved performance and security.

Decomposing a monolithic software application into a modernized application architecture and computing environment is a challenging task for several reasons. However, the benefits of doing so are plenty. For example, modernized software applications tend to reduce the cognitive load on software developers and facilitate technical diversity, improve development team autonomy, and improve resource scalability. The decomposition of a software application broadly refers to refactoring the way in which the software application is designed, often into more modular components that are easier to understand, develop, and maintain. The decomposition process can include several phases such as, for example, refactoring a code base into constituent services and iterating on the process until the defined services are properly defined by their domain boundaries.

Some software modernization applications and systems include tools for analyzing software applications for "decomposition" opportunities. For a software application undergoing such an analysis, for example, a decomposition analysis tool can obtain application artifacts (e.g., source code files, intermediate files, configuration files, etc.) and application profiling metrics (e.g., source code analysis metrics, runtime metrics, etc.). These application artifacts and profiling metrics can then be used generate a graph model of the software application's components and dependency relationships. The graph model, for example, can be visualized as a collection of nodes each representing an independent application abstraction or component (e.g., a package, a file, a class, a method, a data object, etc.) and edges each representing a dependency or other identified relationship among the application components. However, users often struggle to interpret and act on the information provided in such graph-based representations of a software application when attempting to embark on the decomposition process.

These challenges, among others, are addressed by a decomposition analyzer and associated tools that provide additional information related to groupings of nodes in a graph-based representation of software application that are recommended for refactoring. As indicated, the decomposition analyzer can use ML-based techniques and other processes to identify collections of nodes in a graph that may be well suited for decomposition into a separate software service or other type of independent application component. This information can be displayed in connection with a visualization of a graph-based visualization of a software application to enable users to more readily identify portions of a software application that may serve as useful refactoring candidates, among other benefits.

FIG. 1 is an environment including tools used to provide a guided experience for modernizing software applications according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 102 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" (e.g., managed compute service(s) 146) that executes code or provides computing resources for its users in a managed configuration. Examples of managed compute services 146 include, for example, an on-demand code execution service, a hardware virtualization service 106, a container service 108, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service 106 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service 108, such can be a container orchestration and management service (referred to in various implementations as a container service, cloud container service, container engine, or container cloud service) that allows users of the cloud provider network to instantiate and manage containers. In some examples the container service 108 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Software modernization services 110 provides various types of software modernization services and functionality including discovery services 112, assessment services 114, and transformation services 116. These services are collectively aimed at helping users to discover and use recommended modernization and migration paths for their software applications. The discovery services 112, for example, provide various services, software applications, software agents, and other tools (e.g., including downloadable modernization agents 118) used to identify software applications in users' computing environments and to collect profiling information for software applications undergoing modernization processes. The assessment services 114 enable users and applications to obtain various types of software modernization assessments and recommendations, e.g., based on analyses of application artifacts (e.g., source code and bytecode) and application profiling metrics collected for users' applications by the discovery services 112 and associated tools. For example, the recommendations generated by an assessment service 114 can include recommended modernization strategies, recommended modernization tools, estimated modernization costs, etc. In some examples, transformation services 116 include various services, applications, and other tools used to perform modernization actions and migrations, possibly based, for example, on modernization recommendations generated by assessment services 114.

According to examples described herein, a software modernization system can be used to generate proposed decomposition and modernization strategies for software applications undergoing modernization analyses. In some examples, a modernization agent 120 installed in a user's computing environment 122 includes or interfaces with one or more application analyzers used to statically and dynamically analyze application artifacts (e.g., application artifacts 124 including source code, bytecode, or other associated artifacts) obtained for software applications undergoing analysis (e.g., any of software applications 126A, . . . , 126N running on servers 128 and computing device(s) 130) and to optionally obtain other application analysis feeds. In some examples, some or all the source code files, bytecode files, and other application artifacts for a software application under analysis can be obtained from a version control system 132 (including, e.g., source code 134 stored by a version control system 132), automation server, or other storage locations within or external to a user's computing environment 122.

In some examples, a modernization agent 120 or decomposition analyzer application 144 includes or interfaces with one or more application analyzers used to generate application artifacts/metrics 124 related to dependency relationships among application components (e.g., packages, files, classes, methods, variables, etc.), including static and runtime analysis information, version control system commit information, and the like. As described in more detail herein, the application artifacts/metrics 124 can be represented and stored as a graph model and used by a decomposition analyzer 136 or decomposition analyzer service 142 as input to one or more clustering algorithms to identify application component clusters presented in a decomposition assessment 138. The clusters identified by the decomposition analyzer 136 or decomposition analyzer service 142 can be visualized for users in various interfaces, used to recommend to a user a proposed decomposition strategy, and so forth. As shown in FIG. 1, a decomposition analyzer 136 or decomposition analyzer service 142 can execute locally in a user's computing environment 122, as a remotely accessible service provided by a cloud provider network 100, or within other computing environments or combinations thereof.

In FIG. 1, the circles labeled "1"-"5" illustrate an example process in which a user 140 uses one of electronic device(s) 148 to obtain a modernization agent 120 and/or decomposition analyzer application 144 used to inventory and analyze software applications in the user's computing environment 122 including, for example, processes related to decomposing or refactoring a software application to a new, modernized application architecture. For example, the modernized application architecture can include a collection of services each representing, for example, a defined subset of a software application's functionality that, with some amount of refactoring, can be implemented as an independently developed, buildable, and deployable service. For example, in a microservices architecture, an application is implemented as a collection of smaller services ("microservices") that can be deployed and scaled independently from one another and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. As indicated herein, decomposing an application into smaller services can beneficially improve modularity of the application, enables replacement of individual microservices as needed, and parallelizes development by enabling teams to develop, deploy, and maintain their microservices independently from one another. A microservice may be deployed using a virtual machine, container, or serverless function, in some examples. In other examples, a user might desire to modernize an application to another type of architectural pattern (e.g., a multi-tier architecture implemented using containers, etc.)

In some examples, in FIG. 1, a user accesses the software modernization service 110 (for example, via various interfaces provided by discovery services 112) to obtain information about available modernization services and tools and to obtain one or more downloadable modernization agents 120. The user can download one or more modernization agents 120 and install the agents on servers within the user's on-premises computing environment 122 (e.g., on physical servers or VMs). In some examples, users (e.g., a user 140) can use a computing device 148 to interact with the modernization agent 120 via a command line interface (CLI), graphical user interface (GUI), or any other type of interface provided by the modernization agent 120. For example, in FIG. 1, a user 140 has obtained and installed the modernization agent 120 and/or decomposition analyzer application 144, including one or more application analyzers, on a computing device within the user's computing environment 122 (e.g., at an on-premises datacenter or other type of user computing environment) to assist with modernizing one or more software applications 126A, . . . , 126N running in the user's computing environment 122. The software applications 126A, . . . , 126N, for example, may include one or more applications deployed on one or more Linux®-based or Windows®-based hosts and generally represent any type of software that may be executing in a computing environment (e.g., software implementing a web application or service, business application software, etc.). Each of the software applications can be a single process or a group of interoperating processes and may execute within a virtualized or non-virtualized execution environment (e.g., the Java® virtual machine (JVM) in the case of a Java application, or any other execution environment for other types of applications).

As part of a modernization assessment process, in some examples, a user invokes at circle "1" an inventory command used to identify applications within the user's computing environment 122 that can be assessed (e.g., including some or all of software applications 126A, . . . , 126N in the example of FIG. 1) and to collect application data. In some examples, instead of interacting directly with the modernization agent 120, the user 140 instead interacts with a web-based console or other interface provided by the software modernization service 110. The software modernization service 110 may then in turn instruct a modernization agent 120 or other application running in the user computing environment 122 to perform some or all of the application inventory and profiling metrics 124 collection operations described in reference to FIG. 1 such as, for example, identifying an inventory of applications, obtaining application artifacts 124 for the applications (e.g., including source code or binary executable file information identifying JAR files, DLL files, process identifiers, etc.), among other possible types of application profiling information described herein.

In some examples, a modernization agent 120, decomposition analyzer application 144, or other application collects dynamic runtime information about discovered software applications including, e.g., process identifiers, runtime artifacts such as binary executables, JAR files, DLL files, etc. A modernization agent 120 can further collect source code 134, for example, stored in a version control system 132 or other storage location within the user's computing environment 122 or elsewhere. In some embodiments, a user provides a modernization agent 120, software modernization service 110, or both, with authentication information (e.g., a username and password, security token, etc.) that can be used to access the version control system based on a URL or other access identifier.

In some examples, a user 140 optionally further configures the modernization agent 120 and/or decomposition analyzer application 144 with the ability to access an automation server in the user's computing environment, the provider network 100, or elsewhere, e.g., to collect bytecode files or other types of application artifacts. An automation server broadly represents any type of server, service, application, or other tool that helps automate various software development processes such as, for example, building, testing, and deploying software applications. An automation server, for example, may automate such processes to facilitate a continuous integration and continuous delivery approach to software development and deployment. In some examples, the automation server is a server-based system that interfaces with version control tools (e.g., a version control system 132) to identify changes to a repository (e.g., code commits) or other events and may further include configurations used to automate one or more actions responsive to the detection of such events. Users can use an automation server to configure any number of workflows (sometimes also referred to as "jobs," "pipelines," or "projects"), each representing a defined configuration of automated processes for building, testing, and/or deploying software applications. In this example, each workflow may be associated with a configuration file or other data that defines various actions, parameters (e.g., locations of source repositories, names of binary executable files to be generated, locations at which to store binary executable files, etc.). An automation server may provide an interface (e.g., a network-accessible API) via which users and applications can request server-related information and perform various actions including, e.g., obtaining a list of configured workflows, obtaining configuration information associated with configured workflows, creating new workflows, etc.

In some examples, a modernization agent 120 optionally uploads application profiling data including identifiers of the discovered software applications in the user's computing environment 122. The assessment service 114 can use the uploaded application profiling data, for example, to create a software application list that associates the identified software applications with a user account used by the user 140. The software application list, for example, may be displayed to a user in a GUI or other interface to provide a user with information about the discovered set of applications in the user's computing environment 122. In other embodiments, the application profiling data is stored only locally by the modernization agent 120.

In some examples, an assessment service 114, modernization agent 120, and/or decomposition analyzer application 144 further initiates processes to analyze a software application identified by the modernization agent 120 to obtain application profiling metrics 124, where such metrics can be used to generate a graph-based representation of the software application, e.g., as part of a process aimed at decomposing a monolithic software application. In some examples, the software modernization services 110 or decomposition analyzer application 144 receives a request to view a decomposition analysis of a software application including, e.g., an identification of software component clusters, a graph-based visualization of the application, migration options, and the like. The identified clusters, for example, may represent subunits of the software application that can be implemented as an independently deployable component of the software application with some refactoring. In some examples, responsive to such requests, a decomposition analyzer 136 generates or otherwise obtains application profiling metrics 124, a corresponding graph model, or both, collectively representing and providing information about the software application under analysis.

Figure 2:
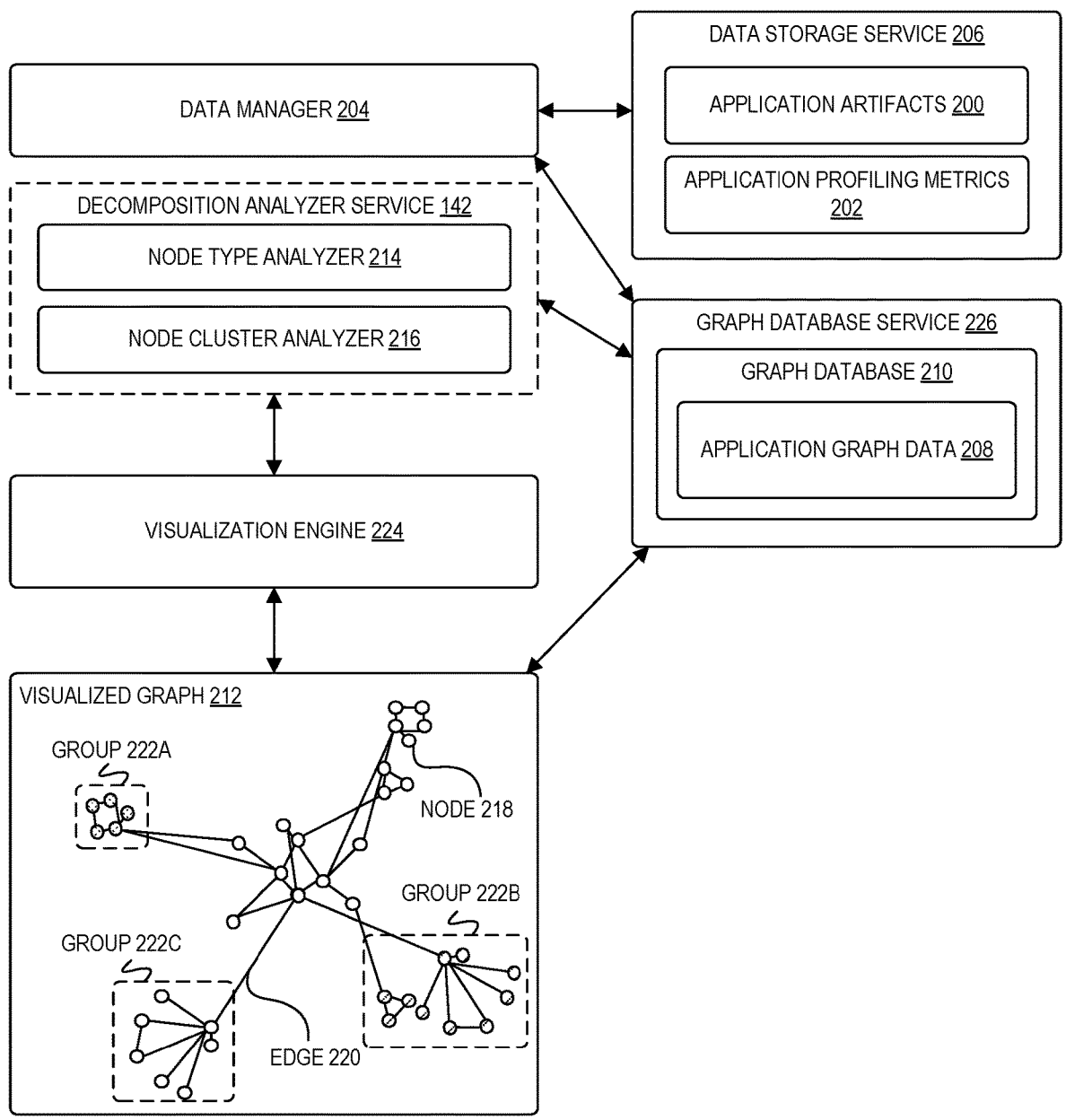
FIG. 2 is a diagram illustrating additional details of a decomposition analyzer and a process for generating a graph-based representation of the components of a software application according to some examples.

FIG. 2 is a diagram illustrating additional details of a decomposition analyzer and a process for generating a graph-based representation of the components of a software application according to some examples. Each of the components shown in FIG. 2 can be part of a decomposition analyzer application 144, decomposition analyzer service 142, or used by those applications/services to aid in the generation of software application graph. In FIG. 2, the application artifacts 200 (including, e.g., source code, bytecode, intermediate language files, or combinations thereof) include various application components (e.g., packages, classes, methods, data objects, etc.) that are provided as input to one or more application analyzers (e.g., a static code analysis tool, a dynamic code analysis tool, a build artifact analysis tool, call graph profilers, version control system repository analyzers, an automation server analyzer, an anti-pattern analyzer, etc.) for analysis of application components and component dependencies. These dependencies generally can represent any combination of static source code-derived dependencies (e.g., based on a class referring to another class, or a method in one class invoking a method in a different class), build-time dependencies, and dynamic runtime dependencies.

As indicated, in some examples, one or more application analyzers perform various types of analyses on application artifacts 200 associated with a software application to obtain application profiling metrics 202. These application profiling metrics 202 can include at least one of: runtime profiling metrics representative of at least one of: a cardinality of program calls between application components, a latency of program calls between application components, or resources used to process program calls between application components; taint analysis metrics representative of sources of user input into the software application and associated data flows through the software application; pointer analysis metrics representative of application components that refer to a same shared object in memory; dynamic reference metrics representative of application components that refer to a same runtime instance of a data object; source code repository metrics representative of information associated with source code file statistics relative a version control system (e.g., indicating a frequency of updates to particular files, instances of files being checked into contemporaneously, etc.); or user input specifying information about particular application component dependencies. In some examples, the application profiling metrics 202 can be associated with varying types of application abstractions and components, e.g., package, file, class, method, or data object-associated metrics.

In some examples, a data manager 204 obtains the application artifacts 200 and application profiling metrics 202 and stores the data at a data storage service 206 (e.g., provided by a cloud provider network 100) or other storage location. The application artifacts 200 and application profiling metrics 202 can be stored as snapshots reflecting a state of the application from which the artifacts and metrics are derived, where an application can be associated with multiple separate snapshots over time. In some examples, a user 140 can interact with the data manager 204 (e.g., via a web-based console or other interface provided by the decomposition analyzer 136) to select application artifacts and metrics to use for analysis, to delete snapshots, and the like.

In some examples, the data manager 204 further generates application graph data 208 representing identified dependency relationships among the application components and profiling metrics (e.g., using the Property Graph format, W3C's RDF format, etc.), and stores the application graph data 208 in a graph database 210 provided by a graph database service 226. The graph model generally includes data representing a plurality of nodes each representing an application component of the application components (e.g., a package, class, method, data object, etc.) and edges each representing a dependency relationship between two application components (e.g., indicating that at least one of the application components is dependent on the other component). In some examples, a visualization engine 224 is used to display a visualized graph 212 of the application graph data 208 as analyzed by the decomposition analyzer service 142 in a web-based console or standalone application GUI. The visualization engine 224, for example, can cause display of a visualized graph 212 based on the data to be displayed (e.g., nodes, edges, optional metadata overlays, etc.) and further based on an amount of screen space into which the graph is to be displayed (e.g., as determined by the dimensions of an interface at which the graph is to be displayed).

In some examples, the decomposition analyzer 136 or decomposition analyzer service 142 includes a node type analyzer 214 and a node cluster analyzer 216, among other possible components. In general, the decomposition analyzer 136 and/or decomposition analyzer service 142 is used to analyze the application graph data to identify clusters of nodes in the graph that may represent collections of application components well suited for refactoring into a separate microservice or other independent application component and to cause the display of such information in the visualized graph 212. In some examples, a node type analyzer 214 is used to analyze application components (e.g., application components corresponding to object-oriented programming classes) to determine a function of the application components (e.g., whether the application component is used to generate a graphical user interface, to manage data associated with the software application, to perform the business logic of the application, etc.). This information can be used, for example, to present in the visualized graph 212. As shown in FIG. 2, a visualized graph 212 including nodes (e.g., node 218) and edges (e.g., edge 220) can include information layered on the visualized graph 212 indicating node types and recommended groupings (e.g., group 222A, group 222B, and group 222C).

In some examples, a node cluster analyzer 216 applies a machine learning-based clustering algorithm (e.g., K-Means clustering, mean-shift clustering, density-based spatial clustering of applications with noise, expectation-maximization clustering, hierarchical clustering, etc.) to the application graph data 208 stored in the graph database 210 to identify a set of clusters. In some examples, the node cluster analyzer 216 performs the clustering responsive to a user request to identify the clusters (e.g., illustrated by group 222A, group 222B, and group 222C) or to view a visualized graph 212 of a software application's components. The identified clusters, visualized graph 212, and other information can be dynamically updated responsive to user input identifying a different set of application artifacts/metrics 124, or settings as described herein. As described in more detail in relation to FIG. 4, the generation of the set of clusters can be based on an application clustering profile that is tailored to the type of application under analysis and a target software application architecture desired by the user modernizing the application.

Returning to FIG. 1, at circles "2A"-"2C," a user generates a decomposition analysis request 152 using a web-based console or other interface and, responsive to such a request, the decomposition analyzer 136 and/or decomposition analyzer service 142 uses the application artifacts/metrics 124 to generate, at circle "3," a decomposition assessment 138, including a visualization of the software application and recommended clusters. As shown in more detail herein, these component clusters can be used to analyze a software application for possible decomposition strategies.

Figure 3:
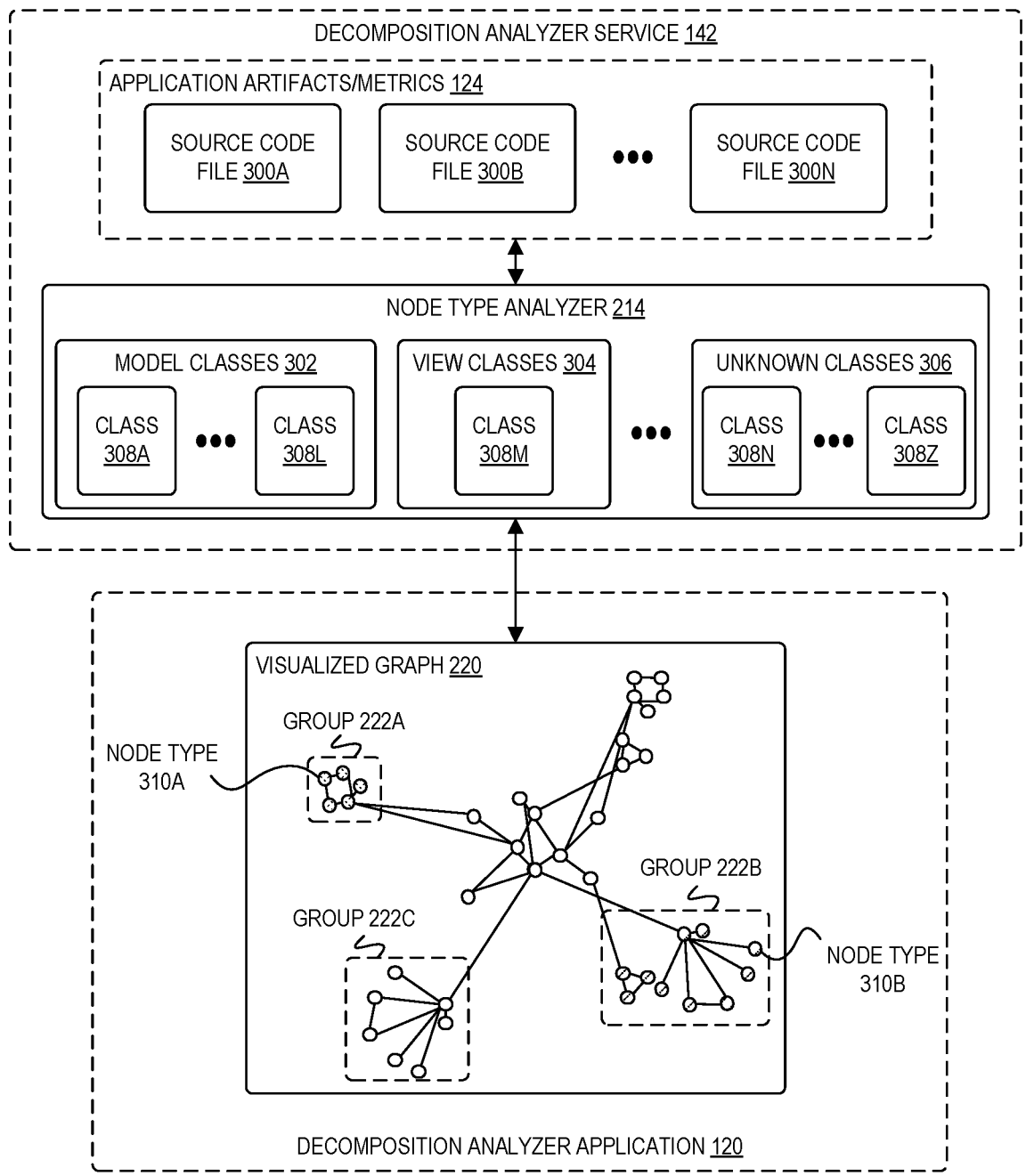
FIG. 3 is a diagram illustrating an example process in which a decomposition analyzer categorizes components of a software application displayed in a visualization of a graph-based representation of the software application according to some examples.

As indicated, in some examples, a visualized graph 212 further includes the display of optional metadata overlays providing additional information about the nodes, edges, and clusters displayed in the graph. FIG. 3 is a diagram illustrating an example process in which a decomposition analyzer application or service categorizes components of a software application displayed in a visualization of a graph-based representation of the software application according to some examples. In the example shown FIG. 3, the visualized graph 212 includes an overlay indicating information about a type of application component represented by certain nodes in the graph. For example, the node type analyzer 214 can analyze the application artifacts/metrics 124 associated with a software application and categorize the application components (e.g., object-oriented classes included in source code file 300A, source code file 300B, . . . , and source code file 300N, comprising an implementation of the application) based on a function of the application components. The categories of application components can include, for example, model classes 302 (e.g., classes used to manage the data associated with the software application, shown as class 308A, . . . , class 308L), view classes 304 (e.g., classes used to generate user interfaces, shown as class 308M), business logic classes, etc. In some examples, the node type analyzer 214 may be unable to categorize some application components into any predefined category and can thus include a category of unknown classes 306 (shown as class 308N, . . . , class 308Z).

As shown, the node type analyzer 214 has categorized classes (e.g., class 308A, . . . , 308L, class 308M, and class 308N, . . . , 308Z) identified from the source code file 300A, source code file 300B, . . . , source code file 300N. The node type analyzer 214 can categorize the classes by analyzing the syntax of the source code files or other structural information associated with the source code files (e.g., identify model classes based on those containing primarily getter/setter methods and little other logic, interface classes based on those containing functions used to display interfaces, etc.). In some examples, the node type analyzer 214 can display information about the identified categories as part of the visualized graph 212, e.g., where a node type 310A can be displayed using a label or other visual indicator that distinguishes the node from another node type 310B.

Figure 4:
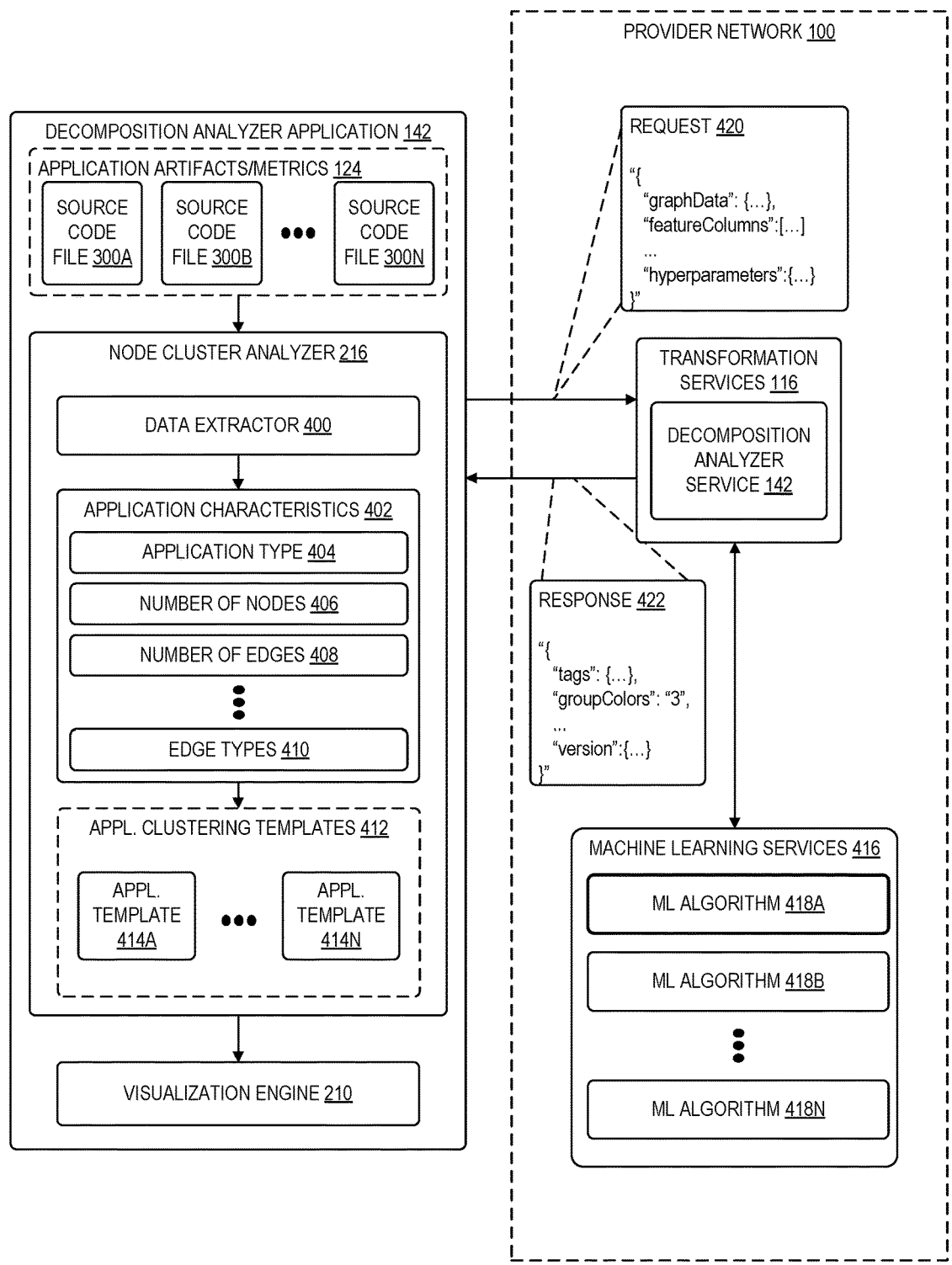
FIG. 4 is a diagram illustrating an example process in which a decomposition analyzer uses a machine learning service to identify recommended clusters of application components for refactoring into microservices or other types of independent application components according to some examples.

FIG. 4 is a diagram illustrating an example process in which a decomposition analyzer application or service uses a machine learning service to identify recommended clusters of application components for refactoring into microservices or other types of independent application components according to some examples. As indicated, the use of machine learning techniques can automate the process of providing recommendations of how to group the classes or other components of a software application. The clustering task, for example, can involve grouping nodes in a graph based on similarities between the nodes, where the features under consideration can depend on a clustering template selected for the application under analysis.

As shown in FIG. 4, a node cluster analyzer 216 includes a data extractor 400 component used to generate several application characteristics 402 from the application artifacts/metrics 124 generated by a modernization agent 120. The application characteristics 402 can include, for example, an application type 404, a number of nodes 406, a number of edges 408, edge types 410, etc. The application characteristics 402 can be derived from, for example, source code of the application under analysis (e.g., source code file 300A, source code file 300B, . . . , source code file 300N), data generated to create the application graph data 208, among other possible sources. The application type 404 (e.g., indicating a source software application architecture such as MVC, multi-tier, etc.) can be derived from an analysis of the graph data 208 or, in other examples, provided as input by a user via a console or other interface.

In some examples, based on the application characteristics 402 and a type of target software application architecture (e.g., as indicated by a user via a web-based console or other interface), the node cluster analyzer 216 identifies an application clustering template 412 (e.g., one of application clustering template 414A, . . . , application clustering template 414N). In some examples, each of the application clustering templates 412 includes parameters related to the use of a machine learning model or algorithm to identify clusters of nodes. Each application clustering template 412 can be developed specifically for clustering the nodes representing a software application to a particular type of target application architecture, where the efforts to modernize software applications to different types of target application architectures can involve different node clustering strategies. For example, it may be beneficial to group nodes in a vertical fashion, where nodes are grouped based on similarities related to the responsibility of the code represented by the nodes, for certain types of target architectures, whereas a horizontal grouping, where nodes are grouped based on type (e.g., classes used to implement user interfaces, classes used to model data, etc.), may be more suitable for other architectures. To accommodate each of these cases, each application clustering template can include parameters related to use of a machine learning model to identify clusters of nodes from a graph-based representation of a software application, where the parameters can include, e.g., a type of machine learning model or algorithm to use, a feature set to use (e.g., from the application characteristics 402 or other data sources), one or more machine learning hyperparameter values (e.g., number of layers, number of epoch, mini-batch size, learning rate, embedding size, hidden embedding size, neighbor aggregation method, etc.), and the like. The possible feature set defined by an application clustering template can include, e.g., class names, namespaces, annotations, comments, method names, number of methods, method return type, number of parameters in each method, parameter type, constructor parameters, call graph information (e.g., parent, child, siblings, neighbors), ingress reference count, egress reference count, number of lines, system calls, etc.

As shown in FIG. 4, the node cluster analyzer 216 can use, via a decomposition analyzer service 142, machine learning services 416 provided by a cloud provider network 100 to perform the clustering processes. For example, upon selection of an application clustering template 412, the node cluster analyzer 216 can generate a request 420, sent to the decomposition analyzer service 142, including parameters based on the application clustering template (e.g., including values for a type of model, hyperparameters, etc.). The decomposition analyzer service 142 can then, in turn, generate requests to the machine learning services 416 based on the parameters included in the request 420. The machine learning service 416 can support the ability to execute many different types of ML models and algorithms (shown as ML algorithm 418A, ML algorithm 418B, . . . , ML algorithm 418N), where a particular type of algorithm can be selected based on the parameters included in the request 420. In some examples, a user can pre-configure one or more ML algorithms for one or more of the application clustering templates 412, such that the algorithm can be readily invoked on demand with the specified hyperparameters (e.g., based on a pre-configured container used to execute the algorithm).

In some examples, the machine learning services 416 can generate the set of clusters using the specified model/algorithm and parameters and send a response including information identifying the clusters. The decomposition analyzer service 142 generates, based on the information returned from the machine learning services 416, a response 422 including information about the identified clusters. The node cluster analyzer 216 can then pass this information to other components of the decomposition analyzer 136 (e.g., a visualization engine 224) to generate a visualized graph 212, where the visualization groups nodes based on the set of clusters (e.g., by drawing bounding boxes around the clustered nodes, or using other types of visual indications of grouped nodes).

In some examples, users can modify the settings associated with clustering to obtain a new clustering. As one example, after a user has obtained an initial visualization and displayed clustering of nodes, a user might provide input modifying a type of target architecture that the user desires to use. The decomposition analyzer 136 can then select a different application clustering template 412 based on the updated selection, send another request to the machine learning services 416 to generate a new clustering of the nodes of the graph, and display information about updated clusters. In this manner, users can explore how the recommendations may change depending on the target application architecture selected by the user. In some examples, users can also modify the recommended clusters, e.g., by providing input via the visualization to add or remove nodes from a cluster. In this example, the decomposition analyzer can store data reflecting the adding or removing of nodes from one cluster to another and cause the updated selections to be displayed in the visualization. Users can thus customize the recommendations based on their own knowledge of the application's structures and their modernization goals. In some examples, custom clusters identified by a user can be used as input to a machine learning algorithm used to generate the clusters (e.g., using a semi-supervised learning process).

In some examples, users can select a cluster in a graph and receive a refactoring recommendation. For example, a user can provide input selecting a cluster displayed in a visualization. Responsive to the selection, the decomposition analyzer can identify a refactoring recommendation based on metrics associated with the cluster (e.g., using a modernization ontology, machine learning process, etc.) and cause display of the refactoring recommendation in association with the visualization. The refactoring recommendation can include information about recommended services of a cloud provider network 100, recommended modifications to source code associated with the application, etc.

Returning to FIG. 1, a user can further use one or more transformation services 116 to modify the software application based on the recommended clusters. For example, the transformation services 116 can help users refactor the source code used to implement the software application based on the identified clusters, convert the refactored portions of the software application to a new architecture, etc. In some examples, at circle "5," a user optionally uses one or more managed compute service(s) 146 to launch 150 a modernized version of the software application, where the modernized or refactored version of the software application is based on at least one cluster identified by the decomposition analyzer 136. For example, a user can launch a refactored version of a software application as a collection of microservices hosted by an on-demand compute service, as a collection of containers managed by a container service 108, or using any other collection of compute services depending on the resulting architecture.

Figure 5:
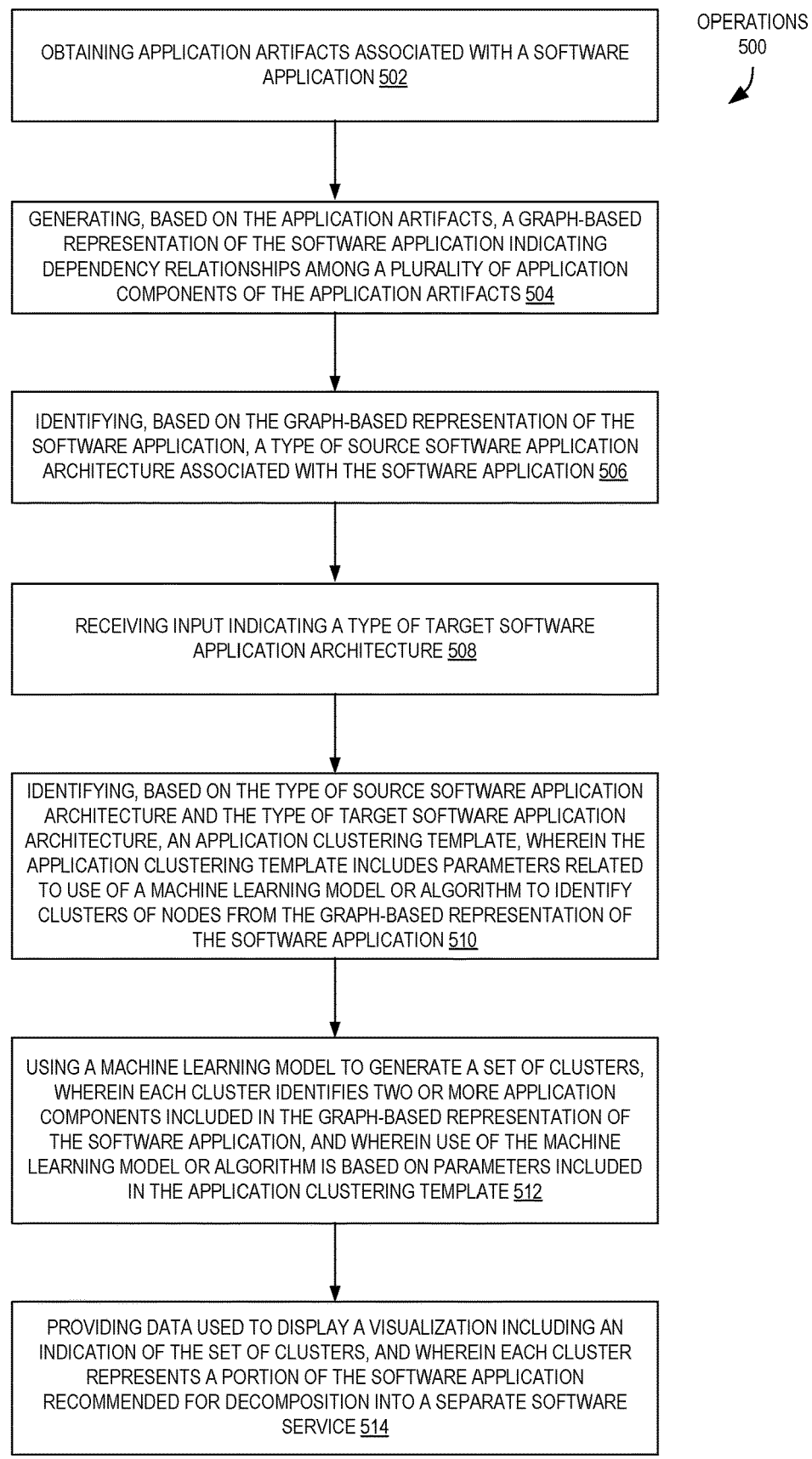
FIG. 5 is a flow diagram illustrating operations of a method for providing a guided experience for modernizing software applications including generating recommended decomposition opportunities according to some examples.

FIG. 5 is a flow diagram illustrating operations 500 of a method for providing a guided experience for modernizing software applications according to some examples according to some examples. Some or all the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by a decomposition analyzer 136 of the other figures.

The operations 500 include, at block 502, obtaining application artifacts associated with a software application.

The operations 500 further include, at block 504, generating, based on the application artifacts, a graph-based representation of the software application indicating dependency relationships among a plurality of application components of the application artifacts.

The operations 500 further include, at block 506, identifying, based on the graph-based representation of the software application, a type of source software application architecture associated with the software application.

The operations 500 further include, at block 508, receiving input indicating a type of target software application architecture.

The operations 500 further include, at block 510, identifying, based on the type of source software application architecture and the type of target software application architecture, an application clustering template, wherein the application clustering template includes parameters related to use of a machine learning model or algorithm to identify clusters of nodes from the graph-based representation of the software application.

The operations 500 further include, at block 512, using a machine learning model to generate a set of clusters, wherein each cluster identifies two or more application components included in the graph-based representation of the software application, and wherein use of the machine learning model or algorithm is based on parameters included in the application clustering template.

The operations 500 further include, at block 514, providing data used to display a visualization including an indication of the set of clusters, and wherein each cluster represents a portion of the software application recommended for decomposition into a separate software service.

In some examples, the operations further include analyzing, by a software modernization service of a cloud provider network, an application component to determine a function of the application component, wherein the function of the application component is one of: generating a user interface, managing data associated with the software application, or an application programming interface (API) class; assigning a label to the application component based on the function of the application component; and including the label in the data used for the display of visualization of the graph-based representation of the software application.

In some examples, a first application component of the plurality of application components corresponds to an object-oriented programming class, and the operations further include: determining that a function of the object-oriented programming class is to manage data associated with the software application; identifying, using the graph-based representation of the software application, one or more second application components of the plurality of application components that interact with the first application component, wherein the first application component and the one or more second application components represent a group of application components recommended for decomposition into a separate software service; and causing display, in the visualization of the graph-based representation of the software application, an indication of the group of application components recommended for decomposition into a separate software service.

In some examples, the parameters of the application clustering template include at least one of: a type of machine learning model or algorithm, hyperparameter values, or a feature set.

In some examples, using the machine learning model or algorithm to generate the set of clusters includes: sending, to a machine learning service of a cloud provider network, a request to generate the set of clusters, wherein the request includes the parameters included in the application clustering template; and receiving, from the machine learning service, data indicating the set of clusters.

In some examples, the type of target software application architecture is a first type of target software application architecture, wherein the application clustering template is a first application clustering template, wherein the machine learning model or algorithm is a first machine learning model or algorithm, wherein the parameters related to use of a machine learning model or algorithm are a first set of parameters, and wherein the set of clusters is a first set of clusters, and wherein the operations further include: receiving input selecting a second type of target software application architecture; identifying, based on the second type of target software application architecture, a second application clustering template, wherein the second application clustering template includes second parameters related to use of a second machine learning model or algorithm; and using the second machine learning model or algorithm to generate a second set of clusters.

In some examples, the operations further include receiving, via the visualization of the graph-based representation of the software application, adding or removing a node from a cluster of the set of clusters; and storing data reflecting the adding or removing the node from the cluster of the set of clusters.

In some examples, the operations further include receiving input selecting a cluster from the set of clusters; identifying a refactoring recommendation based on metrics associated with the cluster; and causing display of the refactoring recommendation in association with the visualization.

In some examples, the operations further include obtaining, from a modernization agent installed in a user's computing environment, the application artifacts, wherein the modernization agent generates one or more metrics associated with the application artifacts, and wherein the graph-based representation of the software application is generated in part based on the one or more metrics.

In some examples, the application clustering template is associated with a pre-configured machine learning model managed by a machine learning service of a cloud provider network, and wherein using the machine learning model to generate the set of clusters includes invoking use of the pre-configured machine learning model.

In some examples, the operations further include obtaining a refactored version of the software application, wherein the refactored version of the software application is based on at least one cluster of the set of clusters; and launching the refactored version of the software application using a managed compute service provided by a cloud provider network.

In some examples, the operations further include receiving input identifying a custom cluster of two or more application components; and using the custom cluster of two or more application components as input to the machine learning model or algorithm.

Figure 6:
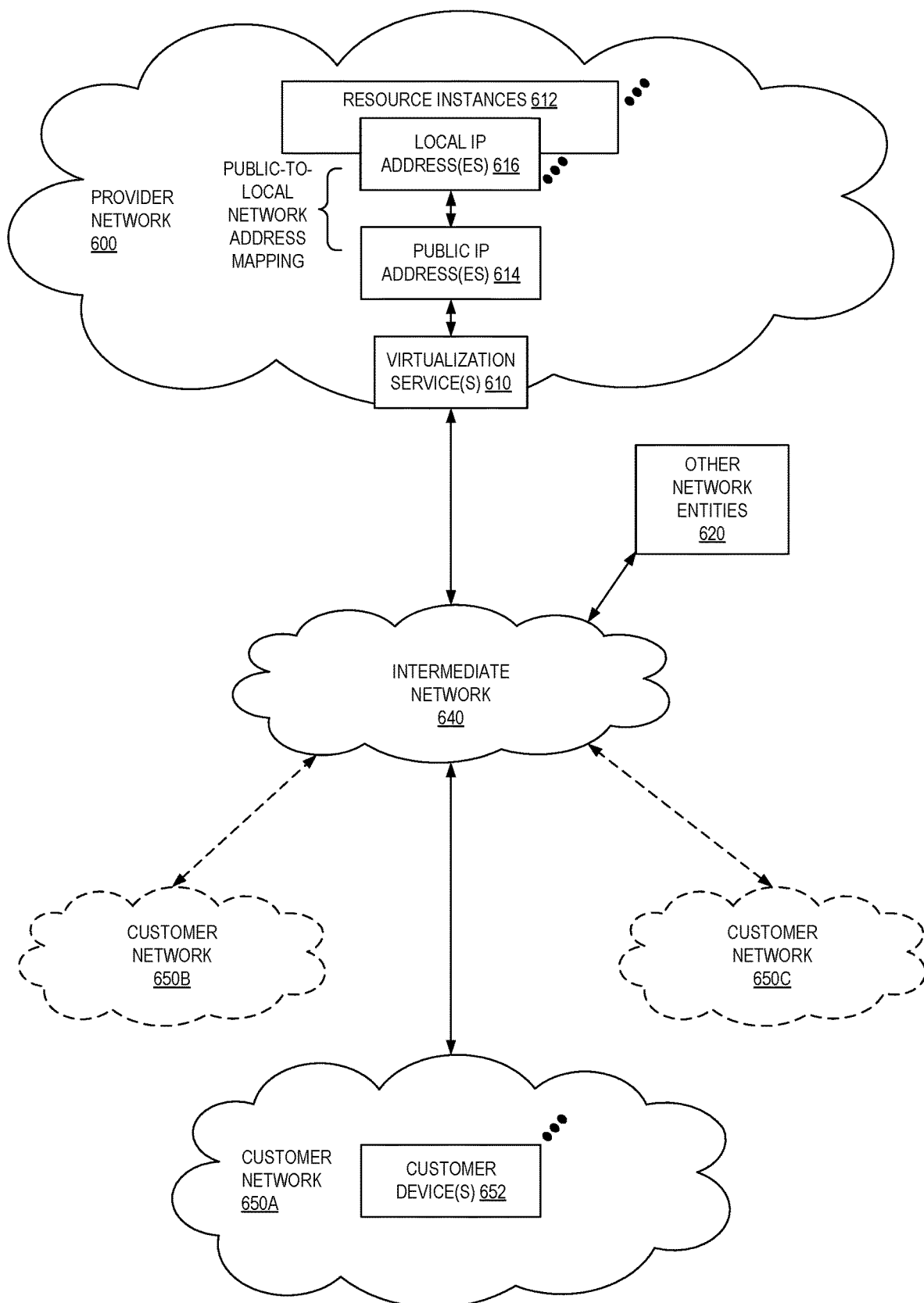
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
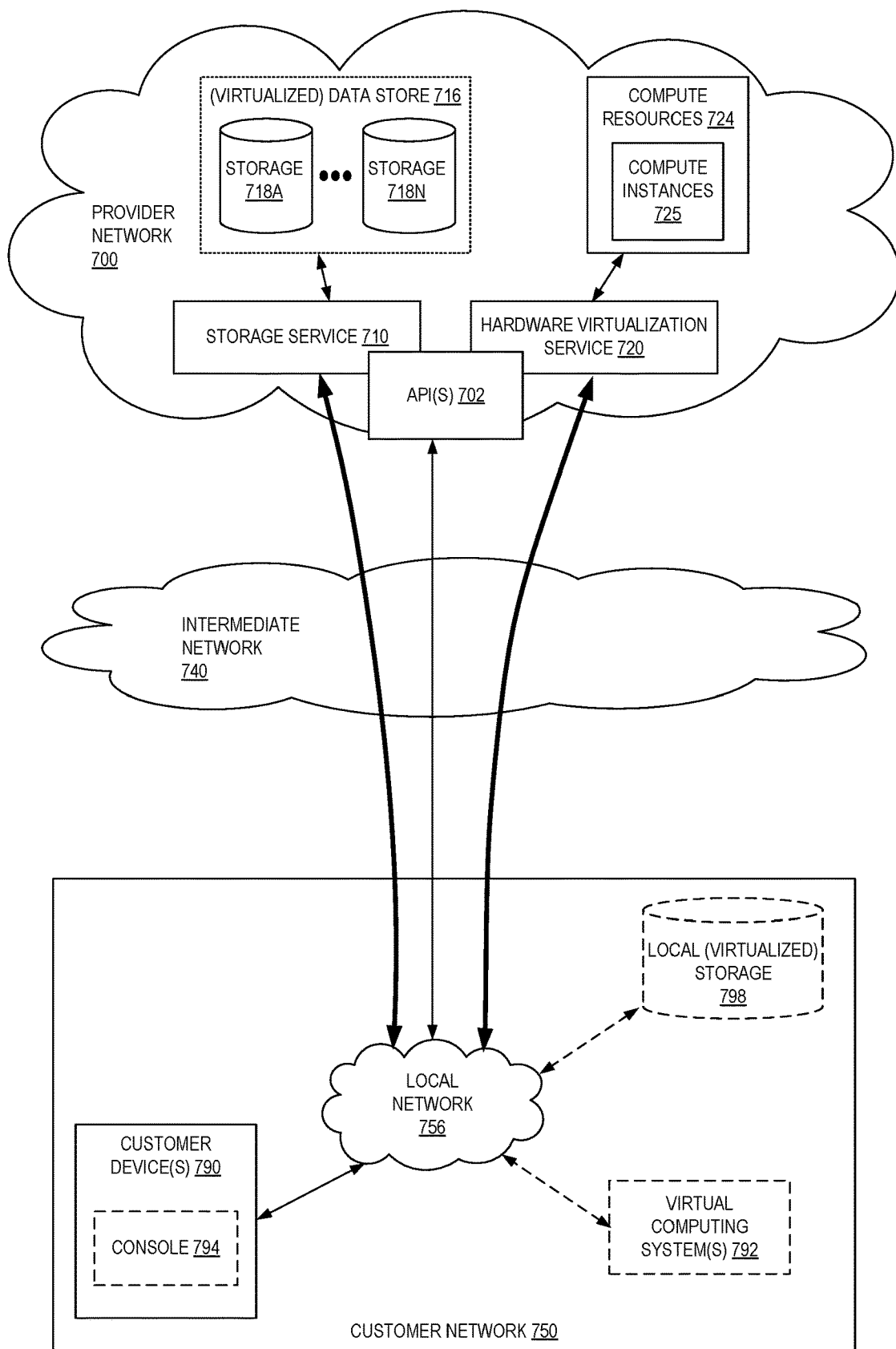
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
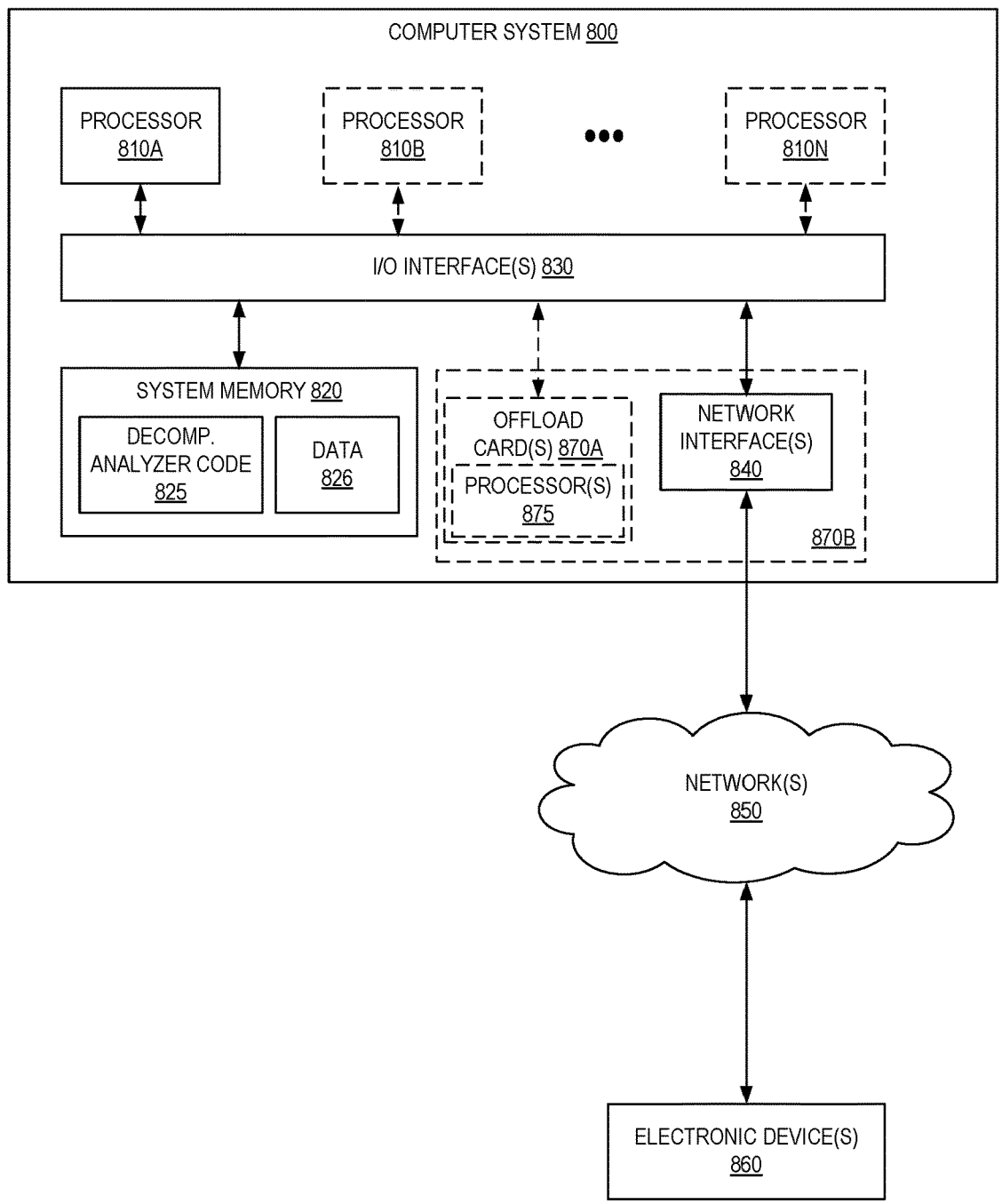
FIG. 8 is a block diagram illustrating an example computer system that can be used in some examples.

In some examples, a system that implements a portion or all of the techniques described herein can include a general-purpose computer system, such as the computer system 800 illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as decomposition analyzer code 825 (e.g., executable to implement, in whole or in part, the decomposition analyzer 136) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and can not coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   obtaining, by a software modernization service of a cloud provider network, application artifacts associated with a software application, wherein the application artifacts include at least one of: source code files, bytecode files, or intermediate language files;
   generating, based on the application artifacts, a graph-based representation of the software application indicating dependency relationships among a plurality of application components of the application artifacts, wherein the graph-based representation includes:
      a plurality of nodes each representing an application component of the plurality of application components, and
      a plurality of edges each representing a dependency relationship between two application components of the plurality of application components;
   identifying, based on the graph-based representation of the software application, a type of source software application architecture associated with the software application;
   receiving input indicating a type of target software application architecture;
   identifying, based on the type of source software application architecture and the type of target software application architecture, an application clustering template, wherein the application clustering template includes parameters related to use of a machine learning model or algorithm to identify clusters of nodes from the graph-based representation of the software application, and wherein the parameters include at least one of: a type of machine learning model or algorithm, a feature set, or one or more machine learning hyperparameters;
   sending, to a machine learning service of the cloud provider network, a request to cluster nodes from the plurality of nodes of the graph-based representation of the software application, wherein the request includes parameters based on the application clustering template;
   obtaining, from the machine learning service, a set of clusters each including two or more nodes from the plurality of nodes; and
   providing data used to display a visualization including an indication of the set of clusters, and wherein each cluster represents a portion of the software application recommended for decomposition into a separate software service.

2. The computer-implemented method of claim 1, wherein the method further comprises:
   analyzing, by the software modernization service, an application component of the plurality of application components to determine a function of the application component, wherein the function of the application component is one of: generating a user interface, managing data associated with the software application, or an application programming interface (API) class;
   assigning a label to the application component based on the function of the application component; and
   including the label in data used for the display of the visualization of the graph-based representation of the software application.

3. The computer-implemented method of claim 1, wherein a first application component of the plurality of application components corresponds to an object-oriented programming class, and wherein the method further comprises:
   determining that a function of the object-oriented programming class is to manage data associated with the software application;
   identifying, using the graph-based representation of the software application, one or more second application components of the plurality of application components that interact with the first application component, wherein the first application component and the one or more second application components represent a group of application components recommended for decomposition into a separate software service; and
   causing display, in the visualization of the graph-based representation of the software application, an indication of the group of application components recommended for decomposition into a separate software service.

4. A computer-implemented method comprising:
   obtaining application artifacts associated with a software application;
   generating, based on the application artifacts, a graph-based representation of the software application indicating dependency relationships among a plurality of application components of the application artifacts;
   identifying, based on the graph-based representation of the software application, a type of source software application architecture associated with the software application;
   receiving input indicating a type of target software application architecture;
   identifying, based on the type of source software application architecture and the type of target software application architecture, an application clustering template, wherein the application clustering template includes parameters related to use of a machine learning model or algorithm to identify clusters of nodes from the graph-based representation of the software application;
   using a machine learning model or algorithm to generate a set of clusters, wherein each cluster identifies two or more application components included in the graph-based representation of the software application, and wherein use of the machine learning model or algorithm is based on parameters included in the application clustering template; and
   providing data used to display a visualization including an indication of the set of clusters, and wherein each cluster represents a portion of the software application recommended for decomposition into a separate software service.

5. The computer-implemented method of claim 4, wherein the method further comprises:
   analyzing, by a software modernization service of a cloud provider network, an application component of the plurality of application components to determine a function of the application component, wherein the function of the application component is one of: generating a user interface, managing data associated with the software application, or an application programming interface (API) class;
   assigning a label to the application component based on the function of the application component; and
   including the label in the data used for the display of visualization of the graph-based representation of the software application.

6. The computer-implemented method of claim 4, wherein a first application component of the plurality of application components corresponds to an object-oriented programming class, and wherein the method further comprises:
- determining that a function of the object-oriented programming class is to manage data associated with the software application;
- identifying, using the graph-based representation of the software application, one or more second application components of the plurality of application components that interact with the first application component, wherein the first application component and the one or more second application components represent a group of application components recommended for decomposition into a separate software service; and
- causing display, in the visualization of the graph-based representation of the software application, an indication of the group of application components recommended for decomposition into a separate software service.

7. The computer-implemented method of claim 4, wherein the parameters of the application clustering template include at least one of: a type of machine learning model or algorithm, hyperparameter values, or a feature set.

8. The computer-implemented method of claim 4, wherein using the machine learning model or algorithm to generate the set of clusters includes:
- sending, to a machine learning service of a cloud provider network, a request to generate the set of clusters, wherein the request includes the parameters included in the application clustering template; and
- receiving, from the machine learning service, data indicating the set of clusters.

9. The computer-implemented method of claim 4, wherein the type of target software application architecture is a first type of target software application architecture, wherein the application clustering template is a first application clustering template, wherein the machine learning model or algorithm is a first machine learning model or algorithm, wherein the parameters related to use of a machine learning model or algorithm are a first set of parameters, and wherein the set of clusters is a first set of clusters, and wherein the method further comprises:
- receiving input selecting a second type of target software application architecture;
- identifying, based on the second type of target software application architecture, a second application clustering template, wherein the second application clustering template includes second parameters related to use of a second machine learning model or algorithm; and
- using the second machine learning model or algorithm to generate a second set of clusters.

10. The computer-implemented method of claim 4, further comprising:
- receiving, via the visualization of the graph-based representation of the software application, adding or removing a node from a cluster of the set of clusters; and
- storing data reflecting the adding or removing the node from the cluster of the set of clusters.

11. The computer-implemented method of claim 4, further comprising:
- receiving input selecting a cluster from the set of clusters;
- identifying a refactoring recommendation based on metrics associated with the cluster; and
- causing display of the refactoring recommendation in association with the visualization.

12. The computer-implemented method of claim 4, further comprising obtaining, from a modernization agent installed in a user's computing environment, the application artifacts, wherein the modernization agent generates one or more metrics associated with the application artifacts, and wherein the graph-based representation of the software application is generated in part based on the one or more metrics.

13. The computer-implemented method of claim 4, wherein the application clustering template is associated with a pre-configured machine learning model managed by a machine learning service of a cloud provider network, and wherein using the machine learning model to generate the set of clusters includes invoking use of the pre-configured machine learning model.

14. The computer-implemented method of claim 4, further comprising:
- obtaining a refactored version of the software application, wherein the refactored version of the software application is based on at least one cluster of the set of clusters; and
- launching the refactored version of the software application using a managed compute service provided by a cloud provider network.

15. The computer-implemented method of claim 4, further comprising:
- receiving input identifying a custom cluster of two or more application components; and
- using the custom cluster of two or more application components as input to the machine learning model or algorithm.

16. A system comprising:
- a first one or more electronic devices to implement a software modernization service in a multi-tenant provider network, wherein the software modernization service includes instructions that upon execution cause the software modernization service to:
  - obtain application artifacts associated with a software application, wherein the application artifacts include at least one of: source code files, bytecode files, or intermediate language files;
  - generate, based on the application artifacts, a graph-based representation of the software application indicating dependency relationships among a plurality of application components of the application artifacts, wherein the graph-based representation includes:
    - a plurality of nodes each representing an application component of the plurality of application components, and
    - a plurality of edges each representing a dependency relationship between two application components of the plurality of application components;
  - identify, based on the graph-based representation of the software application, a type of source software application architecture associated with the software application;
  - receive input indicating a type of target software application architecture;
  - identify, based on the type of source software application architecture and the type of target software application architecture, an application clustering template, wherein the application clustering template includes parameters related to use of a machine learning model or algorithm to identify clusters of nodes from the graph-based representation of the software application, and wherein the parameters include at least one of: a type of machine learning model or algorithm, a feature set, or one or more machine learning hyperparameters;

send, to a machine learning service of the multi-tenant provider network, a request to cluster nodes from the plurality of nodes of the graph-based representation of the software application, wherein the request includes parameters based on the application clustering template;

obtain, from the machine learning service, a set of clusters each including two or more nodes from the plurality of nodes; and provide data used to display a visualization including an indication of the set of clusters, and wherein each cluster represents a portion of the software application recommended for decomposition into a separate software service; and a second one or more electronic devices to implement a machine learning service in the multi-tenant provider network, wherein the machine learning service includes instructions that upon execution cause the machine learning service to:

receive the request to cluster nodes from the plurality of nodes based on the graph-based representation of the software application;

generate the set of clusters using a machine learning model or algorithm; and send a response identifying the set of clusters.

17. The system of claim 16, wherein the software modernization service further includes instructions that upon execution cause the software modernization service to:

analyze, by the software modernization service, an application component of the plurality of application components to determine a function of the application component, wherein the function of the application component is one of: generating a user interface, or managing data associated with the software application;

assign a label to the application component based on the function of the application component; and cause display of the label in the visualization of the graph-based representation of the software application.

18. The system of claim 16, wherein a first application component of the plurality of application components corresponds to an object-oriented programming class, and wherein the software modernization service further includes instructions that upon execution cause the software modernization service to:

determine that a function of the object-oriented programming class is to manage data associated with the software application;

identify, using the graph-based representation of the software application, one or more second application components of the plurality of application components that interact with the first application component, wherein the first application component and the one or more second application components represent a group of application components recommended for decomposition into a separate software service; and cause display, in the visualization of the graph-based representation of the software application, an indication of the group of application components recommended for decomposition into a separate software service.

19. The system of claim 16, wherein the parameters of the application clustering template include at least one of: a type of machine learning model or algorithm, hyperparameter values, or a feature set.

20. The system of claim 16, wherein the type of target software application architecture is a first type of target software application architecture, wherein the application clustering template is a first application clustering template, wherein the machine learning model or algorithm is a first machine learning model or algorithm, wherein the parameters related to use of a machine learning model or algorithm are a first set of parameters, and wherein the set of clusters is a first set of clusters, and wherein the software modernization service further includes instructions that upon execution cause the software modernization service to:

receive input selecting a second type of target software application architecture;

identify, based on the second type of target software application architecture, a second application clustering template, wherein the second application clustering template includes second parameters related to use of a second machine learning model or algorithm; and generate a second set of clusters using the second machine learning model or algorithm.

* * * * *